United States Patent [19]

Itazawa

[11] Patent Number: 5,631,756
[45] Date of Patent: May 20, 1997

[54] DISPLAY APPARATUS WITH CORNER HOLDING PLATES

[75] Inventor: Toshiaki Itazawa, Yamato, Japan

[73] Assignee: Canon Kabushiki Kaisha, Tokyo, Japan

[21] Appl. No.: 390,666

[22] Filed: Feb. 17, 1995

[30] Foreign Application Priority Data

Feb. 18, 1994 [JP] Japan .................................. 6-045037

[51] Int. Cl.$^6$ .................................................. G02F 1/1333
[52] U.S. Cl. ..................... 349/58; 315/169.3; 315/169.4; 349/149
[58] Field of Search ........................... 315/169.3, 169.4; 345/205, 206; 359/36, 54, 55, 83, 82, 85, 88

[56] References Cited

U.S. PATENT DOCUMENTS

| | | | |
|---|---|---|---|
| 4,083,177 | 4/1978 | Nishimura et al. | 58/23 R |
| 4,183,629 | 1/1980 | Nishimura et al. | 350/334 |
| 4,704,559 | 11/1987 | Suginoya et al. | 315/169.1 |
| 4,772,100 | 9/1988 | Suenaga | 350/336 |
| 5,164,887 | 11/1992 | Sakai et al. | 361/392 |
| 5,404,185 | 4/1995 | Vogeley et al. | 359/55 X |

FOREIGN PATENT DOCUMENTS

| | | |
|---|---|---|
| 63-300224 | 12/1988 | Japan . |
| 5-333358 | 12/1993 | Japan . |
| 6-273788 | 9/1994 | Japan . |

*Primary Examiner*—Robert Pascal
*Assistant Examiner*—Haissa Philogene
*Attorney, Agent, or Firm*—Fitzpatrick, Cella, Harper & Scinto

[57] ABSTRACT

A display apparatus includes a display cell having a plurality of electrodes, a cell-supporting member for supporting the display cell, and a circuit substrate connected to the display cell for driving the display cell. The circuit substrate is supported for limited movement; relative to the cell-supporting member by a holding plate. The holding plate may preferably be composed of a plate spring for pressing the circuit substrate against the cell-supporting member.

2 Claims, 4 Drawing Sheets

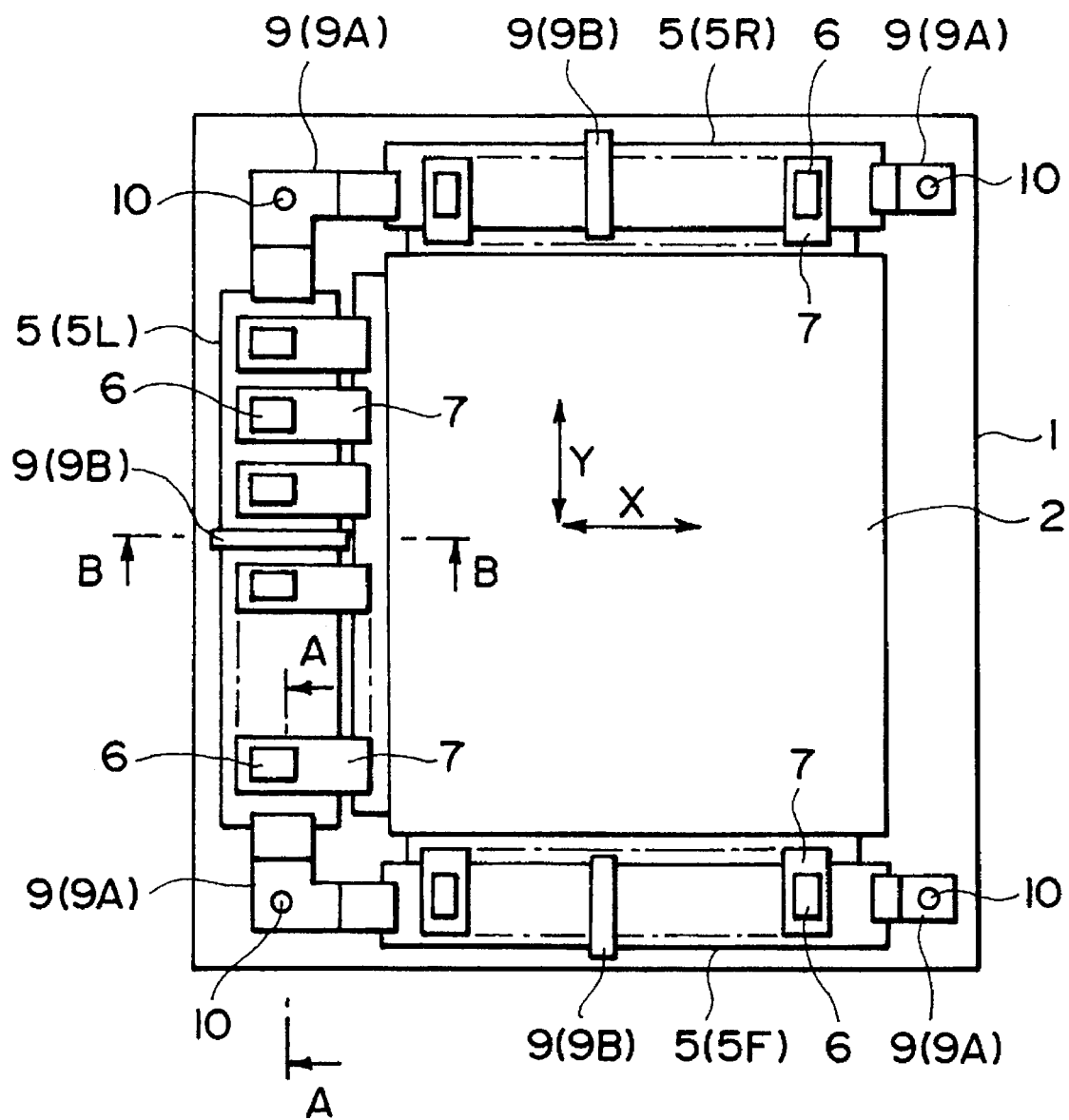
F I G. 1

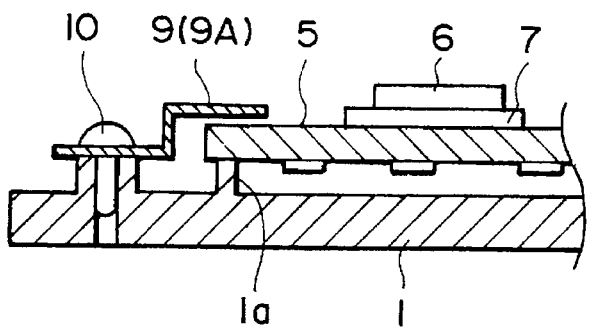
F I G. 3
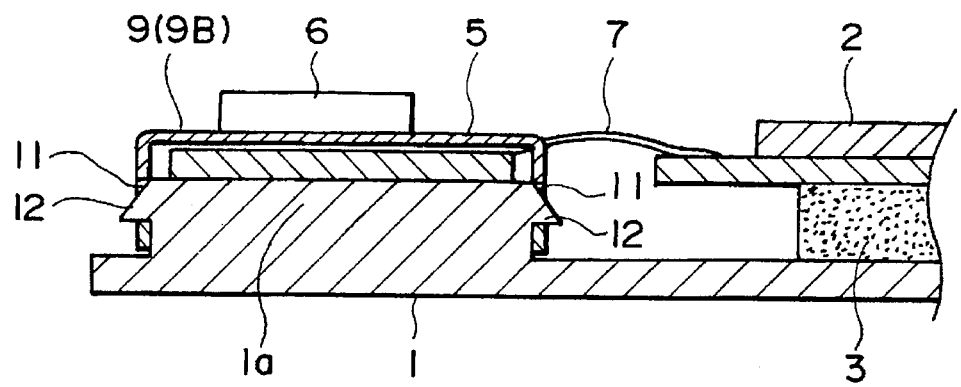
F I G. 4
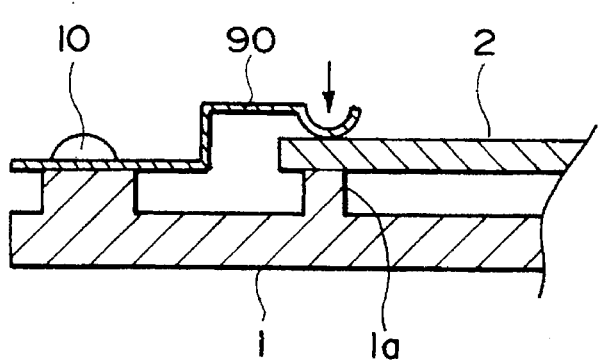
F I G. 5

1

DISPLAY APPARATUS WITH CORNER HOLDING PLATES

FIELD OF THE INVENTION AND RELATED ART

The present invention relates to a display apparatus for use as a display for a personal computer, a view finder for a video camera recorder, etc., and for use in various image data processing apparatus, and particularly a liquid crystal display apparatus including a liquid crystal cell and a circuit substrate for driving the liquid crystal cell respectively disposed on a cell-fixing plate.

Known display apparatus may include an electroluminescence display (ELD), a plasma display and a liquid crystal display (LCD). In such a liquid crystal display apparatus, a display cell (device) comprising a liquid crystal disposed between a pair of transparent electrode plates each having thereon a large number of transparent electrodes is fixed by bonding onto a cell-supporting plate as a member for supporting the display cell and, on the same cell-supporting plate, a driver board (circuit substrate) comprising an IC for driving the cell is disposed on the peripheral part of the display cell. A driver board includes a plurality of TAB-ICs having terminals connected to a flexible tape and is electrically and mechanically connected to the display cell via the flexible TAB film of the TAB-ICs. The driver board is supported onto the cell-supporting plate separately from the display cell so that it will not leap out of the cell-supporting plate when the display apparatus receives a vibration or a mechanical shock.

A cell-fixing plate for a liquid crystal display apparatus may for example comprise glass fiber-reinforced polycarbonate, and a liquid crystal cell as a display cell may comprise a pair of glass plates between which a liquid crystal material such as a nematic liquid crystal or a ferroelectric liquid crystal is sealed up. Accordingly, the cell-fixing plate and the liquid crystal cell may have different thermal expansion coefficients. As a result, the relative positions of these members can be changed when they are subjected to a change in environmental temperature or a thermal stress during the production process. In such a case, if the driver board is fixed so as not to be moved relative to the cell-fixing plate, the TAB film or soldered parts on both sides are supplied with a stress and can be damaged.

Accordingly, the driver board is supported so as to be movable in a direction parallel to the cell-fixing plate, following a relative positional change with the cell-supporting plate and the liquid crystal cell.

FIG. 6 is a partial sectional view showing a supporting structure for a driver board in a conventional liquid crystal display apparatus, and FIG. 7 is a corresponding partial sectional view thereof.

Hitherto, as shown in these figures, elongated holes 21 or U-shaped lacks 22 are formed in a driver board 20, and the driver board 20 is movably fastened to the cell-fixing plate 25 by flat screws 23 threaded through the elongated holes 21 or lacks 22.

However, in the above-described conventional supporting structure for a driver board 20 in a liquid crystal display apparatus, the driver board 20 is size-enlarged in order to ensure a space for providing elongated holes or lacks. Particularly, when such a driver board 20 is desired to be disposed on mutually adjacent two sides of a display cell, an angular space SA as shown in FIG. 6 is already occupied by the driver board 20 provided to one side, so that another space for disposing a remaining driver board (not shown) is not left. Accordingly, in order to fix such another driver board in a similar manner, it is necessary to provide a further space therefor, so that there results in a further enlargement of the apparatus.

SUMMARY OF THE INVENTION

An object of the present invention is to provide a display apparatus allowing a compact assemblage of a circuit substrate while ensuring a good connection state between the circuit substrate and a display cell (device).

According to the present invention, there is provided a display apparatus, comprising: a display cell having a plurality of electrodes, a cell-supporting member for supporting the display cell, a circuit substrate connected to the display cell for driving the display cell, and a supporting means for supporting the circuit substrate movably relative to the cell-supporting member.

The supporting means comprises a holding plate for preventing the circuit substrate from moving away from the cell-supporting member.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a plan view showing an entire liquid crystal display apparatus according to the present invention.

FIG. 3 is a sectional view of the supporting structure taken along an A—A line in FIG. 1.

FIG. 4 is a sectional view of the supporting structure taken along a B—B line in FIG. 1.

FIG. 5 is an exploded partial perspective view of another supporting structure for a driver board in a liquid crystal display apparatus according to the invention.

DESCRIPTION OF THE PREFERRED EMBODIMENTS

In the display apparatus according to the present invention, a circuit substrate (driver board) is supported not immovably relative to a cell-fixing plate as a cell-supporting member but movably so as to allow some movement in a prescribed direction. The direction in which the movement is allowed may preferably be one in which the elongation or shrinkage of the respective members due to thermal expansion, etc., can be relaxed.

More specifically, it is preferred that a relative movement is allowed along a plane or surface on which terminals for a display panel are disposed and/or a plane or surface on which terminals of a circuit substrate are disposed.

Examples of the display cell (device) used in the present invention may include display cells comprising an optical modulation material, such as a liquid crystal material, an electroluminescent material or an electrochromic material, between a pair of substrates; a display cell comprising an electron emission device array, and an array of reflecting mirrors.

It is preferred to connect such a display cell (device) and a circuit substrate with an electroconductive adhesive, etc., via a flexible wiring member, such as a tape carrier.

Hereinbelow, an embodiment of the present invention will be described with reference to the drawings.

Figure 2:
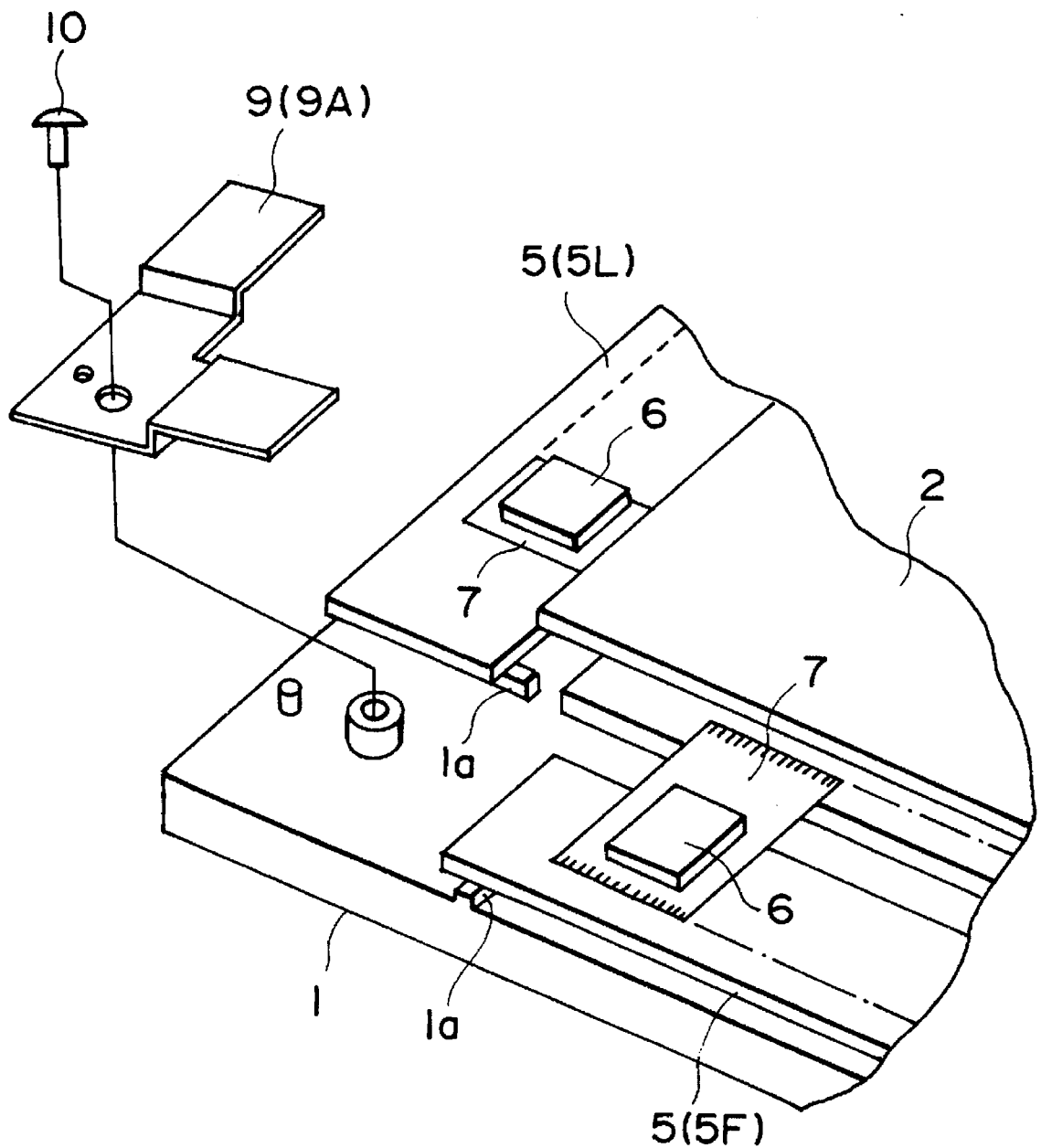
FIG. 2 is an exploded partial perspective view showing a supporting structure for a driver board of the liquid crystal display apparatus.
Figure 6:
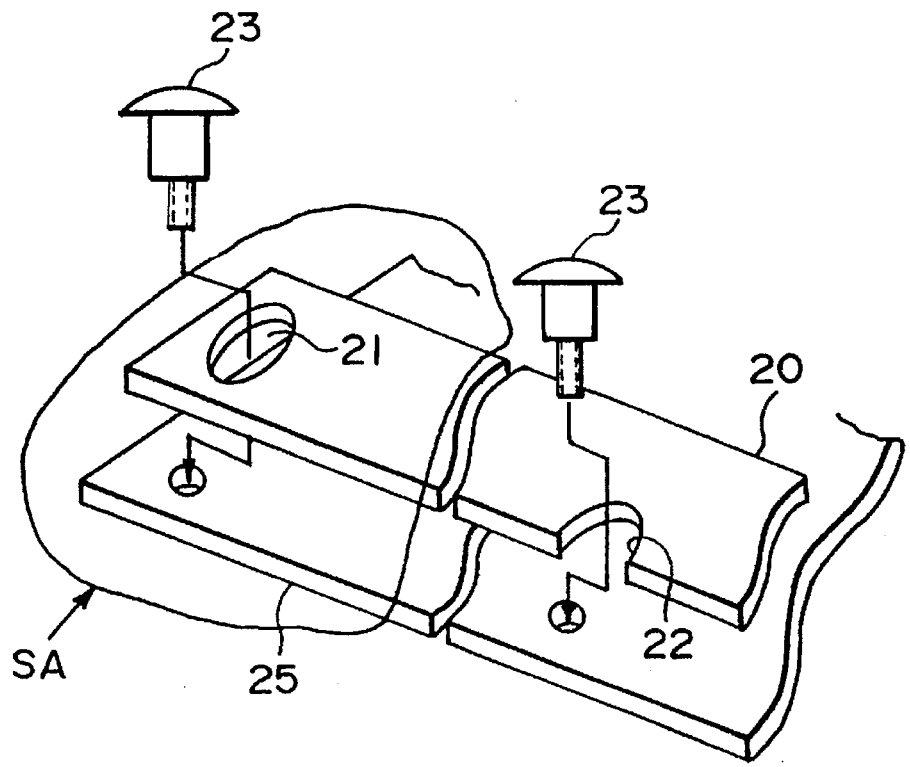
FIG. 6 is a partial perspective view of a driver board-supporting structure in a conventional liquid crystal display apparatus.
Figure 7:
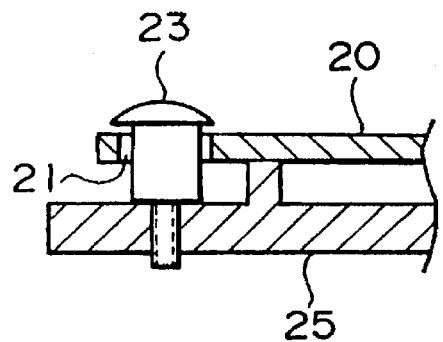
FIG. 7 is a partial sectional view of the supporting structure.

FIG. 1 is a plan view showing an entire liquid crystal display apparatus according to the present invention; FIG. 2 is an exploded partial perspective view showing a supporting structure for a driver board of the liquid crystal display apparatus; and FIGS. 3 and 4 are sectional views of the supporting structure taken along lines A—A and B—B, respectively, in FIG. 1.

Referring to these figures, in the liquid crystal display apparatus according to the present invention, a circuit substrate 2 is fixed onto a cell-fixing plate 1 as a cell-supporting member and, as a means for supporting the circuit substrate 2 onto the cell-fixing plate 1, a holding or pressing plate 9 for regulating the movement of the circuit substrate 2 in a direction perpendicular to the cell-fixing plate 1.

The holding plate 9 may also be composed of a plate spring so as to be pressed against the upper surface of the circuit substrate 2.

By using such a holding plate 9 as a supporting means, the circuit substrate 2 can be supported by utilizing only a small space or region on the upper surface of the circuit substrate 2. As a result, the space required for supporting the circuit substrate 2 can be reduced remarkably so that the circuit substrate 2 can be reduced in size by that much.

Further, by composing the holding plate of a plate spring, it becomes possible to support the circuit substrate 2 movably in a direction parallel to the cell-fixing plate 1 but with no play or idling in a direction perpendicular to the cell-fixing plate 1. At the same time, it is possible to use a holding plate of an identical size and an identical shape for circuit substrates of different thicknesses.

As shown in FIG. 4, a liquid crystal cell 2 for display is affixed with an adhesive 3 onto a central part of a single cell-fixing plate 1 and, on the peripheral sides of the liquid crystal cell 2, driver boards (circuit substrates) 5 for driving the cell are disposed. Each driver board 5 is loaded with a plurality of TAB-ICs 6 and is mounted on a leg 1a of the cell-fixing plate 1 and is electrically and mechanically connected with the liquid crystal cell 2 via a flexible TAB film 7. The TAB-ICs 6 on the drive board 7 receive drive signals from a control apparatus (not shown) via a flat cable to drive the liquid crystal cell 2.

As described with reference to the conventional apparatus example, the driver board 5 is supported onto the cell-fixing plate 1 movably in a direction parallel to the cell-fixing plate 1 so as to follow a relative positional change between the cell-fixing plate 1 and the liquid crystal cell 2 due to a change in environmental temperature, etc. The liquid crystal display apparatus according to the present invention is characterized by a supporting structure of the driver board 7 onto the cell-fixing plate 1.

More specifically, driver boards 5 as described above are supported by a holding plate 9 regulating the movement of the board 5 in a direction perpendicular to the cell-fixing plate 1 so as to prevent a large degree of displacement or jumping when the apparatus is subjected to a vibration or impact. Further, referring to FIG. 1, a driver board 5L disposed on the left side of the liquid crystal cell 2 is supported movably in an X-direction (laterally), and driver boards 5F and 5R disposed on the front and rear sides are supported movably in a Y-direction (longitudinally).

In this embodiment, each driver board 5 is supported by holding plates 9 at its both ends and central part. Among the holding plates, a holding plate 9A for supporting both ends of each driver board 5 is bent stepwise (FIG. 3) and is fixed with a screw 10 to the cell-fixing plate 1 so that the tip thereof is superposed with a slight gap (0.1–0.2 mm) onto a part of the upper surface of the driver board 5 free from the TAB film 7. Further, among the holding plates 9 supporting both ends of each driver board, one for supporting an end of the driver board 5L disposed on the left side of the liquid crystal cell 2 and one for supporting a left end of the driver board 5F or 5R disposed on the front or rear side of the liquid crystal cell 2 are integrally formed into an L-shaped one, which is fastened with a single screw 10 to the cell-fixing plate 1.

Further, a holding plate 9B for supporting the central part of each driver board 5 is bent at a right angle at its both ends into a broad U-shape (FIG. 4) and is fixed onto the cell-fixing plate 1 by engagement of holes 11 dug in the bent parts thereof and projections 12 formed on a leg 1a of the cell-fixing plate 1. The holding plate 9B is also fixed with a slight gap (0.1–0.2 mm) onto a part of the upper surface of the driver board 5 free from the TAB film 7 and also with a small gap between the bent parts and the board 5 so as not to prevent the movement of the board 5 in a direction parallel to the cell-fixing plate 1.

As described above, by using holding plates 9, a driver board 5 can be supported by utilizing a very small space or region on the upper surface. In other words, the space required for supporting a driver board 5 can be substantially minimized so that the driver board 5 can be reduced in size. Further, by integrating an adjacent pair of holding plates 9A, the assembling operation can be simplified.

<Another embodiment>

In the previous embodiment, a holding plate 9 is disposed with a slight gap above the upper surface of a driver board. However, as is shown in FIG. 5 (a partial sectional view), a holding plate 90 may be composed of a plate spring comprising a metal or a synthetic resin so that the tip thereof is pressed against the upper surface of a driver board 5 with a pressing force such that the movement of the driver board 5 in a direction parallel to the cell-fixing plate 1.

By using such a holding plate 90 composed of a plate spring, a driver board 5 can be supported movably in a direction parallel to the cell-fixing plate and yet completely free from play or oscillation in a direction perpendicular to the cell-fixing plate 1. At the same time, it is also possible to use a single holding plate of an identical shape and an identical size for driver boards 5 of different thicknesses. Further, by composing a holding plate of an electroconductive material and holding it at a prescribed potential, it is also possible to have the holding plate also function as a grounding terminal. In this instance, if the holding plate is electrically connected to a grounding terminal of the circuit substrate, it becomes easy to ensure the grounding potential.

As described above, in the display apparatus, inclusive of a liquid crystal display apparatus, according to the present invention, a circuit substrate for driving a display cell is supported to a cell-fixing plate by means of a holding plate, so that it becomes possible to remarkably reduce the space required for supporting the circuit substrate, thereby reducing the entire size of the resultant display apparatus.

Further, by composing the holding plate of a plate spring so as to press it against the upper surface of the circuit substrate, the circuit substrate can be supported in a completely play-free state and also a single holding plate of an identical size and an identical shape can be used for circuit substrates having different thicknesses.

What is claimed is:

1. A display apparatus, comprising:

a display cell having a plurality of electrodes and a plurality of sides;

a cell-supporting member for supporting said display cell;

a plurality of circuit substrates, with one of said circuit substrates disposed along each of at least two sides of said display cell and each carrying a circuit connected to said display cell for driving said display cell; and supporting means for supporting said circuit substrates, said supporting means comprising a holding plate for supporting said circuit substrates for limited movement relative to said cell supporting member, with said holding plate being disposed in proximity to a corner of said display cell and holding one end each of a pair of said circuit substrates disposed along two sides of said display cell.

2. A display apparatus according to claim 1, wherein said holding plate comprises a plate spring for pressing said circuit substrate against said cell-supporting member.

* * * * *

UNITED STATES PATENT AND TRADEMARK OFFICE
CERTIFICATE OF CORRECTION

PATENT NO. : 5,631,756  
DATED : May 20, 1997  
INVENTOR(S) : Itazawa

It is certified that error appears in the above-identified patent and that said Letters Patent is hereby corrected as shown below:

[57] ABSTRACT:

Line 5, "movement;" should read --movement--.

COLUMN 3:

Line 16, "circuit sub-" should read --liquid crystal cell--.
Line 17, "state" should be deleted.
Line 18, "circuit substrate" should read --liquid crystal cell--.
Line 20, "circuit substrate" should read --liquid crystal cell--.
Line 25, "circuit substrate" should read --liquid crystal cell--.
Line 27, "circuit substrate" should read --liquid crystal cell--.
Line 28, "circuit substrate" should read --liquid crystal cell--.
Line 29, "circuit" should read --liquid--.
Line 30, "substrate" should read --crystal cell-- and "circuit" should read --liquid--.
Line 31, "substrate" should read --crystal cell--.
Line 34, "circuit substrate" should read --liquid crystal cell--.
Line 38, "circuit" should read --liquid--.
Line 39, "substrates" should read --crystal cell--.

UNITED STATES PATENT AND TRADEMARK OFFICE
CERTIFICATE OF CORRECTION

PATENT NO. : 5,631,756
DATED : May 20, 1997
INVENTOR(S) : Itazawa

Page 2 of 2

It is certified that error appears in the above-identified patent and that said Letters Patent is hereby corrected as shown below:

```
Line 49, "drive" should read --driver-- and "7" should
  read --5--.
Line 60, "7" should read --5--.
```

Signed and Sealed this

Fourteenth Day of April, 1998

Attest:

BRUCE LEHMAN

*Attesting Officer*          *Commissioner of Patents and Trademarks*